United States Patent
Ikeda

(10) Patent No.: US 7,013,134 B2
(45) Date of Patent: Mar. 14, 2006

(54) MOBILE WIRELESS TELECOMMUNICATIONS DEVICE

(75) Inventor: Katsunori Ikeda, Tokyo (JP)

(73) Assignee: Hitachi Kokusai Electric Inc., Tokyo (JP)

(*) Notice: Subject to any disclaimer, the term of this patent is extended or adjusted under 35 U.S.C. 154(b) by 568 days.

(21) Appl. No.: 10/131,470

(22) Filed: Apr. 25, 2002

(65) Prior Publication Data
US 2002/0173301 A1 Nov. 21, 2002

(30) Foreign Application Priority Data
May 18, 2001 (JP) ............................ 2001-148897

(51) Int. Cl.
H04M 3/00 (2006.01)
H04Q 7/20 (2006.01)
H04B 1/38 (2006.01)

(52) U.S. Cl. ............... 455/419; 455/414.1; 455/422.1; 455/565

(58) Field of Classification Search ............. 455/456.4, 455/565, 418, 419, 422.1, 574, 414.3
See application file for complete search history.

(56) References Cited

U.S. PATENT DOCUMENTS

| | | | | | |
|---|---|---|---|---|---|
| 5,864,765 | A | * | 1/1999 | Barvesten | 455/565 |
| 6,496,703 | B1 | * | 12/2002 | da Silva | 455/456.4 |
| 6,643,517 | B1 | * | 11/2003 | Steer | 455/456.4 |
| 6,763,238 | B1 | * | 7/2004 | Okano | 455/456.4 |
| 2002/0090931 | A1 | * | 7/2002 | Papineau et al. | 455/411 |

* cited by examiner

Primary Examiner—Rafael Perez-Gutierrez
Assistant Examiner—Marisol Figueroa
(74) Attorney, Agent, or Firm—Wenderoth, Lind & Ponack, L.L.P.

(57) ABSTRACT

A mobile telecommunications device having a wireless transmitter unit that can be set to a transmit-disabled mode in which all wireless transmission is disabled. The mobile telecommunications device includes accepting means for accepting call request operations from a user and releasing means for, when the transmit-disabled mode is set, responding to acceptance of a call request operation by releasing the transmit-disabled mode and causing the wireless transmitter unit to conduct wireless transmission based on the accepted call request operation.

15 Claims, 5 Drawing Sheets (Example of screen displayed at time of call when wireless unit operation disabled)

(Example of screen displayed at time of terminating communication
when wireless unit operation was disabled before start of communication)

MOBILE WIRELESS TELECOMMUNICATIONS DEVICE

BACKGROUND OF THE INVENTION

1. Field of the Invention

The present invention relates to a mobile telecommunications device that can be set to a transmit-disabled mode which disables all wireless transmission by a wireless transmitter unit of the mobile telecommunications device, and more particularly, to such a mobile telecommunications device that improves ease-of-use for a user at the time of calling and at the time of terminating wireless communication.

2. Description of the Prior Art

Recent mobile telephone systems utilizing the PDC standard, for example, conduct zone management for incoming calls. Every time a mobile telephone unit changes zones, information of the mobile telephone unit is wirelessly transmitted from the mobile telephone unit to a control station via a base station. Moreover, wireless transmission by a mobile telephone unit is not limited to that which is caused by zone shifting but also occurs on other occasions, such as when an incoming call is received. Thus, owing to the nature of the mobile telephone system, wireless transmission from a mobile telephone unit to a base station arises not only when the user deliberately places a call but also on other occasions.

Moreover, today's mobile telephone units are generally equipped with various capabilities in addition to that of conducting telephone calls, and users frequently use features of their mobile telephone units other than the mobile telephony facility. In the case of a mobile telephone unit which is equipped with an electronic mail (email), Internet, schedule organizer and/or address book feature, for example, the user will desire to be able to access the WWW (World Wide Web) or view his/her schedule and/or address book, etc. whenever and wherever. In addition, many mobile telephone units are composite units integrating a mobile telephone unit and some other product, such as a game machine or a music record/playback device, in a single unit. In such a case, the user will want to be able to play games and enjoy listening to music whenever and wherever.

However, at various locations, such as on trains and other means of public transportation and at medical facilities like hospitals, mobile telephone units must be prevented from transmitting radio waves in order to avoid interference with other equipment. The user is therefore required to turn off the mobile telephone unit power switch. Specifically, the user needs to turn off the power switch of the mobile telephone unit so that the mobile telephone unit does not emit wireless signals for zone shift and call reception. Once the mobile telephone unit power switch has been turned off, however, the user is prevented from using not only the mobile telephone unit's wireless telephony facility but also other facilities such as the email and address book capabilities.

Consideration has therefore been focused on techniques which avoid turning off power for all functions of the mobile telephone unit but which enable only the power to the wireless unit to be turned off.

Japanese Unexamined Patent Publication No. 11-225378, for example, teaches a wireless telephone device with a telephone book feature that is equipped with a mode switching key that the user can operate to switch between a mode in which the wireless transmission capability is disabled and the telephone book feature is enabled and a mode in which both are enabled. The user of this wireless telephone device can view the telephone book at a place where prevention of wireless transmission from the mobile telephone unit is required by operating the mode switching key to disable the mobile telephone unit's wireless capability but enable its telephone book feature.

With this wireless telephone device, however, when the user wants to make a telephone call upon temporarily leaving the place where wireless transmission from the mobile telephone unit must be prevented, the user can make the call only after switching the mode of the mobile telephone unit so as to release the wireless unit from the operation-disabled state. Moreover, after switching the operating mode and completing the telephone call, the user must once again switch the mobile telephone unit mode so as to disable the operation of the wireless unit before returning to the place where prevention of wireless transmission from the mobile telephone unit is required.

In the mobile telecommunications device and storage medium recorded with a program taught by Japanese Unexamined Patent Publication No. 2000-40970, wireless transmission from the mobile telecommunications device is disabled between an input and cancellation of a transmit-disable command by the user, and when the length of the transmit-disabled period has been set, the user is asked to decide whether or not the transmit-disabled state is to be continued when the transmit-disabled period which is clocked by a timer expires.

The user of this mobile telecommunications device can set the transmit-disabled period so as to be periodically asked whether the operation-disabled state of the wireless unit should be continued. In order to release the wireless unit from the operation-disabled state, however, the user is required to conduct an operation for instructing the mobile telecommunications device not to continue the operation-disabled state. Moreover, the periodic inquiries may occur at a time which is inconvenient for the user, such as when the user is about to make a telephone call. Although this reference says that the wireless unit of the mobile telecommunications device can be put in the operation-disabled state in response to a control signal (special low-power signal or the like) that is produced by a transmit-disable request device, current mobile telecommunications devices are not equipped with such a transmit-disable request device, and provision of the device would involve additional cost and labor.

As discussed above with regard to the prior art, with conventional mobile telephone units, a user who wishes to make a telephone call when the wireless unit is in the operation-disabled state is required to conduct a troublesome operation, and the operation of switching the operating state of the wireless unit is not always compatible with the user's desire to make telephone calls. Moreover, with conventional mobile telephone units, the user is required to conduct a troublesome operation when resetting the wireless unit to the operation-disabled state after releasing the wireless unit from the operation-disabled state in order to make a wireless telephone call.

The present invention was made to overcome these problems of the prior art, and an object of the present invention is to provide a mobile telecommunications device which is configured to enable setting of a transmit-disabled mode that disables all wireless transmission by its wireless transmitter unit, wherein ease-of-use by the user is improved at the time of calling and at the time of terminating wireless communication.

SUMMARY OF THE INVENTION

The present invention achieves the foregoing object by providing a mobile telecommunications device whose wireless transmitter unit can be set to a transmit-disabled mode in which all wireless transmission is disabled. The mobile telecommunications device comprises accepting means for accepting call request operations from a user, and releasing means for, when the transmit-disabled mode is set responding to an acceptance of a call request operation by releasing the transmit-disabled mode and causing the wireless transmitter unit to conduct wireless transmission based on the call request operation.

Therefore, when the transmit-disabled mode is set, the user can, by conducting a call request operation in the conventional manner, release the transmit-disabled mode and make a call based on the call request operation. The convenience of the user making the call is therefore enhanced. Since the release of the transmit-disabled mode and the wireless transmission are conducted in response to a call request operation by the user, the release of the transmit-disabled mode and the wireless transmission are conducted in accordance with the desire of the user to, for example, make a telephone call.

When the transmit-disabled mode is set, all wireless transmission by the wireless transmitter unit is disabled. Taking a mobile telephone unit as an example of the mobile telecommunications device, this means that wireless transmission of control signals and the like from the mobile telephone unit to a base station is disabled. Specific examples of signals whose wireless transmission is disabled include, for example, signals for responding to incoming calls, signals for synchronizing with the base station, signals for switching the zone managing the mobile telephone unit when the mobile telephone unit moves from one to another of zones that are formed by different base stations, signals for registering the location of the mobile telephone unit when, for instance, the power switch of the mobile telephone unit is switched from OFF to ON, signals for checking whether any voice (e.g. voicemail) messages are waiting at a telephone answering service center, and signals for setting a communications band or the like which is used by the mobile telephone unit.

The signals whose wireless transmission is disabled in the transmit-disabled mode may include, for example, signals that must be transmitted during telecommunication and must also be transmitted at times other than during telecommunication, and signals that are not transmitted during telecommunication but must be transmitted at times other than during telecommunication. In the present invention, when the transmit-disabled mode has been set, the transmit-disable mode is released to permit wireless transmission of such signals in response to an acceptance of a call request operation by the user.

The transmit-disabled mode can be constituted either to disable only all wireless transmission by the wireless transmitter unit or also to disable operation of other processing units. When the transmit-disabled mode has been set, designated facilities other than the wireless transmission facility remain operable and can be utilized by the user. The designated facilities that remain operable when the transmit-disabled mode has been set can be any of various facilities including, for example, email and address book facilities.

The transmit-disabled mode can be arranged to be set by an operation of the user. Otherwise, it is possible to adopt a configuration in which the transmit-disabled mode is automatically set when the mobile telecommunications device receives a control signal (a low-power signal, for example) that is wirelessly transmitted by a control device which is installed at a place where prevention of wireless transmission from the mobile telephone unit is required.

The accepting means can be of any of various types and, for example, can be a key or button that is operable by the user.

The call request operation can be any of various operations. A call request operation for making a wireless telephone call can, for example, be an operation of inputting or designating the telephone number of the party to be called and pressing a prescribed dial button. A call request operation for wirelessly establishing a communication capability and conducting wireless data communication with another party can, for example, be an operation of inputting or designating the other party's address or the like and pressing a prescribed send button.

In the case of a call request operation for making a telephone call, the wireless transmission based on the call request operation can, for example, be a wireless transmission to a base station requesting a connection enabling wireless communication with the party whose telephone number was input or designated. In the case of a call request operation for conducting data communication, the wireless transmission based on the call request operation can, for example, be a wireless transmission to a base station requesting a connection enabling wireless communication with the party whose address or the like was input or designated.

The mobile telecommunications device according to the present invention can comprise inquiry means for, when the transmit-disabled mode is set, operating before the releasing means releases the transmit-disabled mode in response to an acceptance of a call request operation to ask the user whether or not release of the transmit-disabled mode is permissible.

Thus, release of the transmit-disabled mode and wireless transmission in response to a call request operation are preceded by an inquiry to the user as to whether release of the transmit-disabled mode is permissible. The user is therefore warned of the release of the transmit-disabled mode before the release is effected.

The inquiry can be made in any of various ways. For example, the inquiry can be displayed on a screen or be output as a voice message.

The mobile telecommunications device according to the present invention can comprise release accepting means for accepting an instruct operation permitting a release input by the user in response to an inquiry from the inquiry means, the releasing means releasing the transmit-disabled mode and causing the wireless transmitter unit to conduct wireless transmission based on the accepted call request operation on the condition that a release-permitted instruct operation was accepted.

Therefore, since the transmit-disabled mode is released and wireless transmission is conducted when a release-permitted instruct operation is accepted after a call request operation was accepted, it is possible to prevent the release of the transmit-disabled mode and wireless transmission in a case where the call request operation is the result of a misoperation.

The mobile telecommunications device according to the present invention can comprise refuse accepting means for accepting an instruct operation refusing a release input by the user in response to an inquiry from the transmit-disabled mode release permissibility inquiry means, the releasing means maintaining the set state of the transmit-disabled mode when a release-refused instruct operation was accepted.

Therefore, even when a call request operation has been accepted, the set state of the transmit-disabled mode is maintained if a release-refused instruct operation is accepted. Since transmit-disabled mode release and wireless transmission are therefore not conducted, it is possible to prevent the release of the transmit-disabled mode and wireless transmission in a case where the call request operation is the result of a misoperation.

The release accepting means and the refuse accepting means can be any of various types, and, for example, can be a key or button that is operable by the user.

The instruct operation permitting release of the transmit-disabled mode and the instruct operation refusing release of the transmit-disabled mode can be any of various types, and, for example, can be operations of pressing prescribed buttons.

The mobile telecommunications device according to the present invention can comprise reset control means for resetting the transmit-disabled mode after completion of wireless communication utilizing wireless transmission which is enabled by the transmit-disabled mode releasing wireless transmission control means.

Therefore, when the transmit-disabled mode is released from the set state and wireless transmission is conducted in response to a call request operation, the transmit-disabled mode is reset after completion of the wireless communication utilizing the wireless transmission. As a result, use of the mobile telecommunications device by the user at completion of wireless communication becomes more convenient. A configuration that releases the transmit-disabled mode and conducts wireless transmission in response to a call request operation of the user and, upon completion of wireless communication utilizing the wireless transmission, resets the transmit-disabled mode is particularly effective when, for example, the user temporarily leaves the place where the transmit-disabled mode was set to make a wireless call or the like and then returns to the same place.

The wireless communication utilizing the wireless transmission which is enabled by the releasing means can, for example, be a wireless call that is conducted by utilizing the wireless transmission which is conducted in response to a call request operation for making a telephone call or be wireless data communication which is conducted by utilizing the wireless transmission that is conducted in response to a call request operation for conducting data communication.

The mobile telecommunications device according to the present invention can comprise reset permissibility inquiry means that operates, upon completion of wireless communication utilizing wireless transmission which is enabled by the releasing means and before the reset control means resets the transmit-disabled mode, to ask the user whether or not reset of the transmit-disabled mode is permissible.

Thus, resetting of the transmit-disabled mode after completion of the wireless communication is preceded by an inquiry to the user ask whether resetting of the transmit-disabled mode is permissible. The user is therefore warned of the resetting of the transmit-disabled mode before the resetting is effected.

The inquiry can be made in any of various ways. For example, the inquiry can be displayed on a screen or be output as a voice message.

The mobile telecommunications device according to the present invention can comprise reset instruction accepting means for accepting an instruct operation permitting a reset input by the user in response to an inquiry from the reset permissibility inquiry means, the reset control means resetting the transmit-disabled mode on the condition that a reset-permitted instruct operation was accepted.

Therefore, since the transmit-disabled mode is reset when an instruct operation permitting resetting of the transmit-disabled mode is accepted after completion of wireless communication, it is possible to reset the transmit-disabled mode only when the user desires (requests) resetting of the transmit-disabled mode.

The mobile telecommunications device according to the present invention can comprise refuse instruction accepting means for accepting an instruct operation refusing a reset input by the user in response to an inquiry from the reset permissibility inquiry means, the reset control means maintaining the released state of the transmit-disabled mode when a reset-refused instruct operation was accepted.

Therefore, even after completion of wireless communication, the released state of the transmit-disabled mode is maintained if a transmit-disabled mode reset-refused instruct operation is accepted. Since wireless transmission is therefore maintained in an enabled state, it is possible to prevent resetting of the transmit-disabled mode when the user requests the transmit-disabled mode to remain released.

The reset instruction accepting means and the refuse instruction accepting means can be any of various types, and, for example, can be a key or button that is operable by the user.

The instruct operation permitting resetting of the transmit-disabled mode and the instruct operation refusing resetting of the transmit-disabled mode can be any of various types, and, for example, can be operations of pressing prescribed buttons.

DETAILED DESCRIPTION OF THE PREFERRED EMBODIMENTS

An embodiment of the present invention will now be explained with reference to the drawings.

Figure 1:
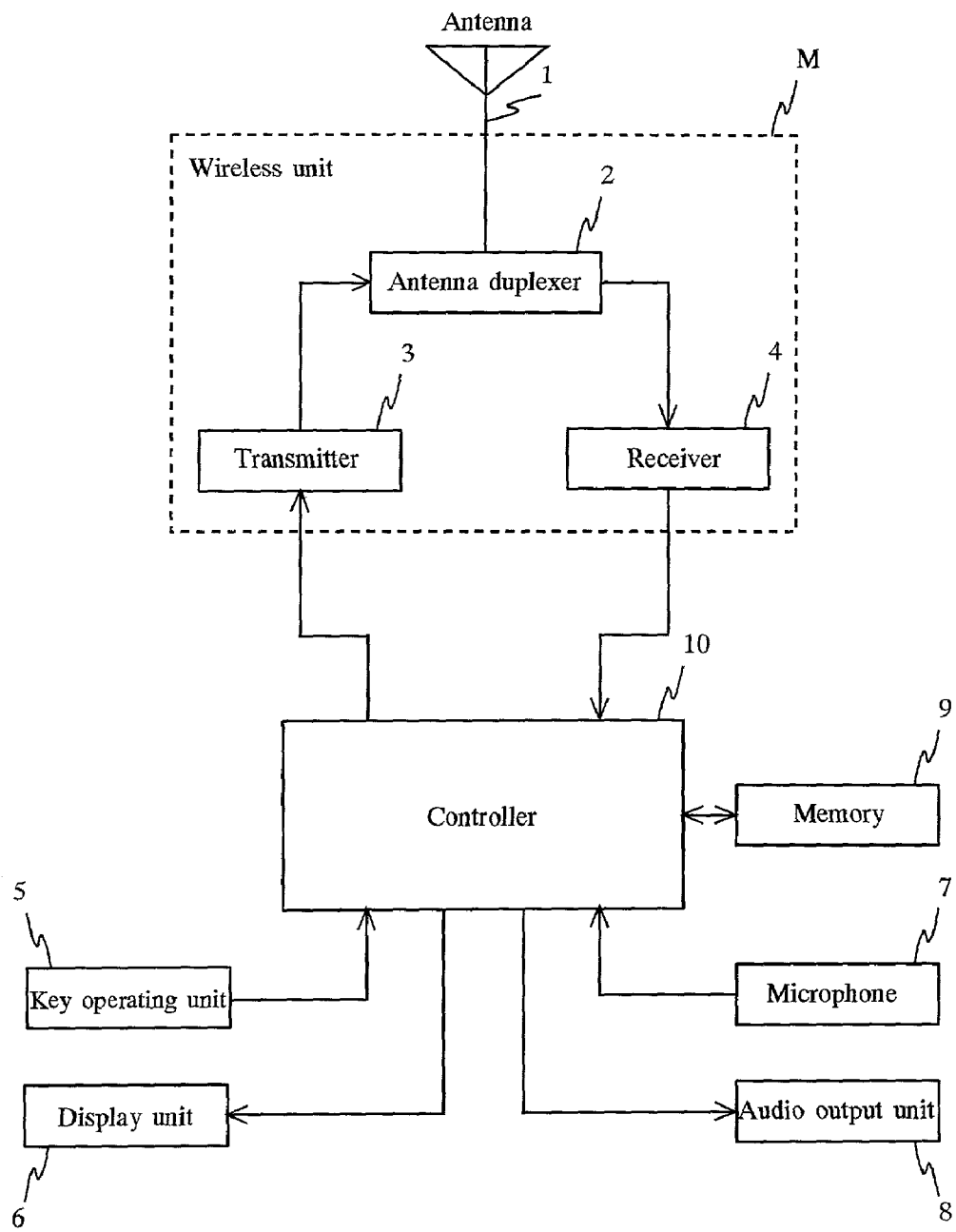
FIG. 1 is a diagram showing the configuration of a mobile telephone unit that is an embodiment of the mobile telecommunications device of the present invention.

FIG. 1 shows the configuration of a mobile telecommunications device that is an embodiment of the present invention. The mobile telephone unit comprises an antenna 1, an antenna duplexer 2 which is connected to the antenna 1, a transmitter 3 which is connected to the antenna duplexer 2, a receiver 4 which is connected to the antenna duplexer 2, a key operating unit 5, a display unit 6, a microphone 7, an audio output unit 8, a memory 9, and a controller 10 to which the transmitter 3, the receiver 4, the key operating unit 5, the display unit 6, the microphone 7, the audio output unit 8 and the memory 9 are connected. In this embodiment, the antenna duplexer 2, the transmitter 3 and the receiver 4 constitute a wireless unit M.

The antenna 1 transmits/receives radio (wireless) signals to/from a base station accommodating the mobile telephone unit. In the present embodiment, signals are transmitted/received between the mobile telephone unit and a control station via the base station by means of such wireless communication.

The antenna duplexer 2, which has a function of separating radio signals that are received by the antenna 1 and radio signals for transmitting output by the transmitter 3, efficiently sends received radio signals to the receiver 4 and radio signals for transmission to the antenna 1.

The transmitter 3 modulates and otherwise processes data that the controller 10 generates for transmission to the control station, and outputs the radio signals to be transmitted to the antenna duplexer 2. As a result, the radio signals to be transmitted are wirelessly transmitted from the antenna 1.

The receiver 4 demodulates and otherwise processes the radio signals that are received by the antenna 1 and input to the antenna duplexer 2, and outputs the demodulated and otherwise processed signals to the controller 10.

The key operating unit 5 includes, for example, numeric keys for inputting numerals, a call key for entering call instructions, a call terminate key for entering call termination instructions, and function keys for activating various functions. When the keys of the key operating unit 5 are operated by the user, the key operating unit 5 outputs corresponding signals to the controller 10. The signals that are generated by the key operating unit 5 and sent to the controller 10 are used as conditions and the like for various kinds of control which is conducted by the controller 10.

The display unit 6 is equipped with a liquid crystal display, for example, and is responsive to instructions from the controller 10 for displaying various kinds of information such as dialing data and information regarding the location inside and outside the service area.

The microphone 7 receives the user's voice and sounds arising in the vicinity of the user (including noise) and outputs corresponding signals to the controller 10.

The audio output unit 8 outputs sound data that is received and demodulated by the receiver 4 as sound which is audible to the user, and plays melodies and the like that are generated by the controller 10.

The memory 9 comprises memory devices such as a RAM (Random Access Memory) and a ROM (Read Only Memory) and stores control data codes and data which is used by the controller 10. When the controller 10 executes various processing and control operations, the memory 9 also temporarily stores data which is related to the processing and control.

The controller 10 controls various functions. The controller 10 receives signals that are output by the processing units 3–9 in their capacity as input sources, processes the signals, and outputs the results of the processing to the processing units 3–9 in their capacity as output destinations. For example, the controller 10 encodes sound data that is received from the microphone 7 and wirelessly transmits the encoded sound data via the transmitter 3, the antenna duplexer 2 and the antenna 1. The controller 10 also receives incoming sound data via the antenna 1, the antenna duplexer 2 and the receiver 4, decodes the received sound data, and outputs the decoded sound data through the audio output unit 8.

The operations of the transmitter 3 and the receiver 4 provided in the wireless unit M of this embodiment are controlled by the controller 10 based on a program or programs stored in the memory 9. This embodiment is configured so that the user can use the key operating unit 5 to set a transmit-disabled mode that puts the operating state of the wireless unit M in a disabled condition. The operation-disabled state of the wireless unit M in the transmit-disabled mode is established, for instance, by cutting off the supply of power to the wireless unit M or by stopping execution of a program task for controlling the wireless unit M. In this embodiment, a program for controlling setting and release of the transmit-disabled mode is stored in the memory 9. The controller 10 executes the program so as to set the transmit-disabled mode for putting the wireless unit M in an operation-disabled condition and to release the set transmit-disabled mode for putting the wireless unit M in an operation-enabled condition.

Thus, in this embodiment, the transmit-disabled mode is implemented with respect to the wireless unit M as a whole. Therefore, when the transmit-disabled mode is set, the transmitter 3 does not conduct wireless transmission and the receiver 4 does not conduct wireless reception, and when the transmit-disabled mode is released, the transmitter 3 conducts wireless transmission and the receiver 4 conducts wireless reception. Further, in the present embodiment, the processing units 5–10 other than the wireless unit M continue to be supplied with power even after the transmit-disabled mode is set so that certain features such as the email feature and the address book feature can be used in the same manner as when the transmit-disabled mode is released.

Information indicating whether the transmit-disabled mode is in the set state or the released state is stored in the memory 9.

The controller 10 is also equipped with an inquiry facility that operates in response to an acceptance by the key operating unit 5 of a user call request operation when the transmit-disabled mode is set by asking the user whether or not release of the transmit-disabled mode is permissible (whether the transmit-disabled mode should or should not be released) and with a facility that releases the transmit-disabled mode and conducts a call operation when the key operating unit 5 accepts an instruction that is made by the user in response to the inquiry indicating that release of the transmit-disabled mode is permissible.

The call request operation which is received from the user may, for example, be an operation for conducting voice communication or an operation for conducting data communication. In the case of voice communication, a call operation is conducted in response to a user call request operation which is effected by inputting the other party's telephone number and pressing a prescribed dial button. In the case of data communication, a call operation is conducted in response to a user call request operation that, in the case of a circuit exchange system, is similar to that for voice communication, while in the case of a packet exchanges system, a call operation for connecting with the other party's device is conducted in response to a user call request operation which is effected by pressing a dedicated key.

Information indicating whether the transmit-disabled mode was in the set state or the released state before the call was made in response to the call request operation is stored in the memory 9.

The controller 10 is also equipped with an inquiry facility that, at the time of completion of wireless communication which is conducted by a call that was made after the transmit-disabled mode was released from the set state, asks the user whether or not resetting of the transmit-disabled mode is permissible (whether the transmit-disable mode should or should not be reset) and with a facility that resets the transmit-disabled mode when the key operating unit 5 accepts an instruction that is made by the user in response to the inquiry indicating that resetting of the transmit-disabled mode is permissible.

Figure 2:
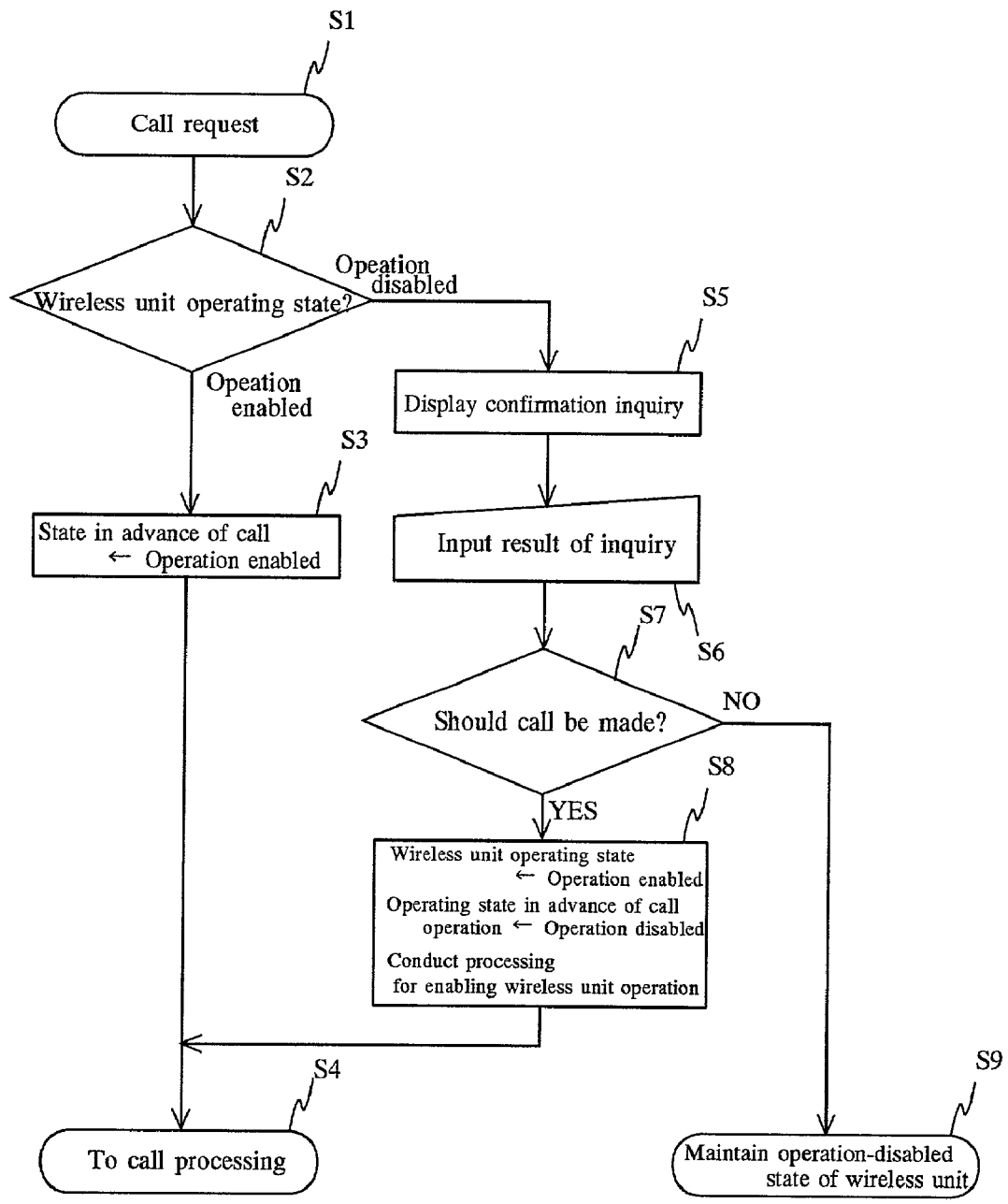
FIG. 2 is a flowchart showing a sequence of procedures which are performed in the mobile telephone unit when a call request occurs.

An example of the sequence of processing steps which are conducted by the mobile telephone unit of this embodiment when the user makes a call request will now be explained with reference to FIG. 2.

When the key operating unit 5 accepts a call request operation that is conducted by the user, the controller 10 judges that a user call request occurred (step S1) and refers to the information that is stored in the memory 9 to determine whether the current operating state of the wireless unit M is the operation-enabled state or the operation-disabled state (step S2).

When it is found that the transmit-disabled mode is currently released, i.e., that the current operating state of the wireless unit M is the operation-enabled state, the controller 10 stores, in the memory 9, information indicating that the transmit-disabled mode is in the released state in advance of the call operation, i.e., information indicating that the operating state of the wireless unit M in advance of the call operation is the operating-enabled state (step S3), and conducts call processing in accordance with the accepted call request operation (step S4). The operations which are performed in this processing sequence are the same as those that are ordinarily performed in a conventional call operation except for the step of storing information regarding the operating state of the wireless unit M in advance of the call operation in memory.

On the other hand, when it is found that the transmit-disabled mode is currently set, i.e., that the current operating state of the wireless unit M is the operation-disabled state, the controller 10 makes an inquiry with respect to the user before releasing the transmit-disabled mode to confirm whether it is permissible to release the transmit-disabled mode and conduct a call operation (step S5).

Figure 3:
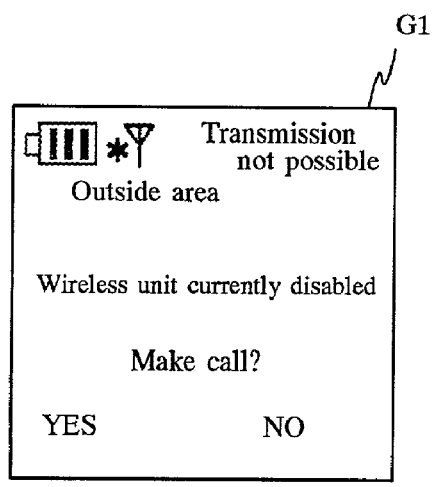
FIG. 3 is a diagram showing an example of a screen that is displayed on a display unit in the case where a call request occurs when operation of a wireless unit is disabled.

The inquiry is made by, for example, using the display unit 6 to display the screen G1 shown in FIG. 3. The screen shown in FIG. 3, as an example, includes such items as "Transmission not possible" indicating that the wireless transmission is currently disabled, "Wireless unit currently disabled" indicating that the transmit-disabled mode is currently set, "Make call?" asking whether or not a call operation should be conducted, and "YES NO" as answers that can be selected by the user in reply to the inquiry.

Next, the controller 10 acquires a reply to the inquiry from the user (step S6). The acquisition of the reply can be achieved, for example, by the method of accepting an instruction which is input by the user's manipulation of the key operating unit 5 or, if the mobile telephone unit is equipped with a voice recognition device, by the method of accepting a voice instruction which is uttered by the user.

When the reply to the inquiry has been accepted from the user, the controller 10 decides the intent of the reply (step S7). When the controller 10 decides that the instruction means that a call operation should be conducted, the controller 10 stores, in the memory 9, information indicating that the state of the transmit-disabled mode in advance of the call operation is the set state, i.e., that the operating state of the wireless unit M in advance of the call operation is the operation-disabled state, changes the transmit-disabled mode from the set state to the released state, i.e., changes the operating state of the wireless unit M from the operation-disabled state to the operation-enabled state, and stores, in the memory 9, information indicating that the current operating state of the wireless unit M is the operation-enabled state (step 8). More specifically, the transmit-disabled mode is released and the wireless unit M is put in the operation-enabled state by supplying power to the wireless unit M or by executing a program task for controlling the wireless unit M.

After the transmit-disabled mode has been released and the wireless unit M been put in the operation-enabled state in this manner, the controller 10 uses the wireless unit M, which is now in the operation-enabled state, to transmit prescribed wireless signals from the antenna 1 and otherwise conduct ordinary call processing (step S4), thereby conducting wireless communication in accordance with the call request operation that is accepted from the user.

On the other hand, when the controller 10 decides that the reply to the inquiry is an instruction not to conduct a call operation, the controller 10 aborts the call operation and maintains the set state of the transmit-disabled mode, i.e., maintains the operating state of the wireless unit M in the operation-disabled state (step S9). In this case, the wireless unit M is not put in the operation-enabled state between the time of the user's call request operation and the time that the controller 10 maintains the operation-disabled state of the wireless unit M. It is therefore possible to prevent undesired wireless transmission from the antenna 1 and to ensure that the wireless unit M does not conduct wireless transmission until the next occasion for wireless transmission.

Figure 4:
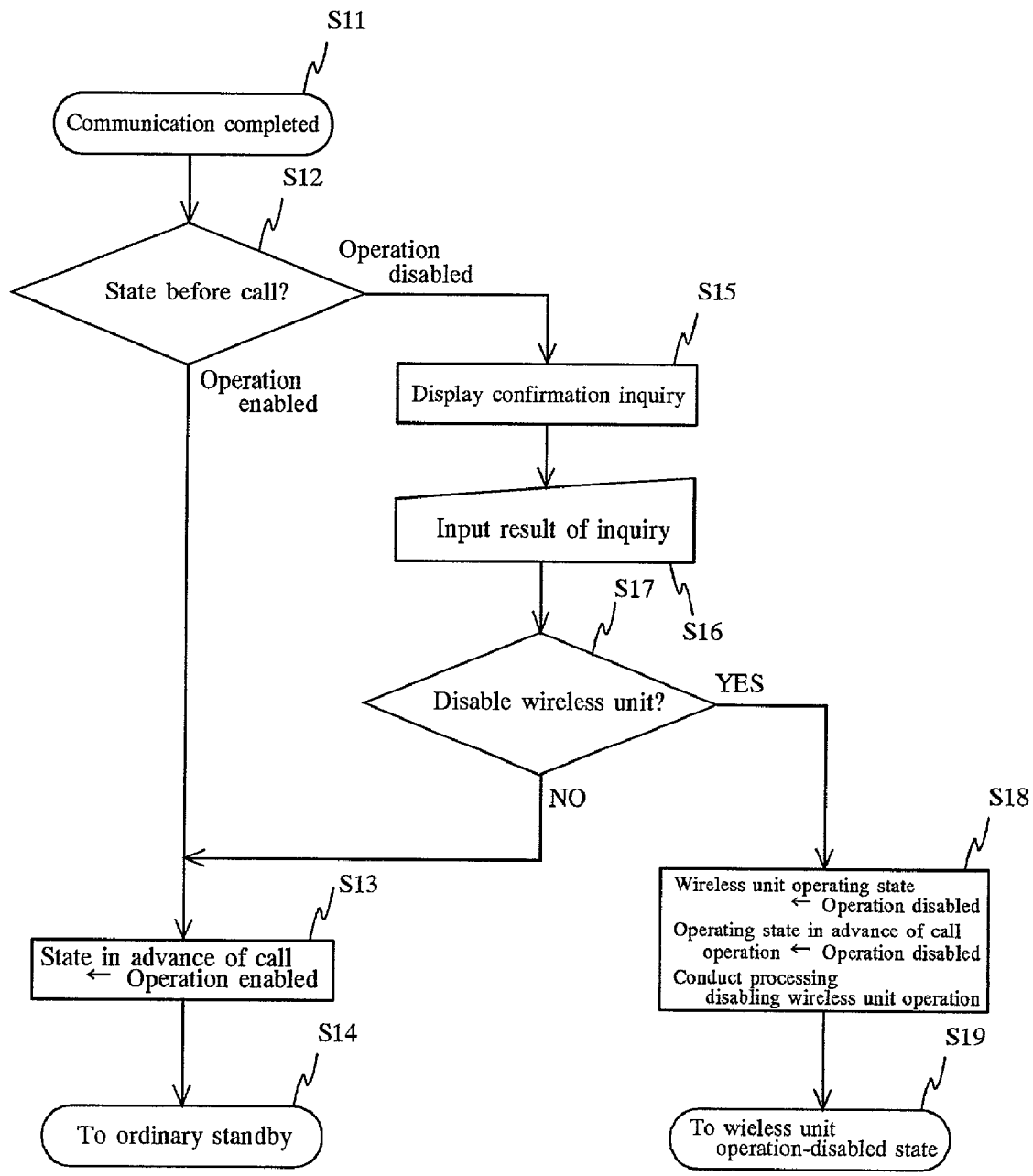
FIG. 4 is a flowchart showing a sequence of procedures which are performed in the mobile telephone unit upon completion of communication.

An example of the sequence of processing steps which are conducted by the mobile telephone unit of this embodiment upon completion of wireless communication will now be explained with reference to FIG. 4.

Upon completion of wireless communication (step S11), the controller 10 refers to the information that is stored in the memory 9 to determine whether the state of the transmit-disabled mode in advance of the call operation that led to the wireless communication was the set state or the released state, i.e., whether the operating state of the wireless unit M in advance of the call operation was the operation-disabled state or the operation-enabled state. (step S12).

When it is found that the operating state of the wireless unit M in advance of the call operation was the operation-enabled state, the controller 10 stores, in the memory 9, information indicating that the state of the transmit-disabled mode in advance of the call operation is the released mode, i.e., information indicating that the operating state of the wireless unit M in advance of the call operation is the operation-enabled state (step S13), and the ordinary standby processing state is restored (step S14). The operations which are performed in this processing sequence are the same as those that are ordinarily performed conventionally at the time of communication termination except for the step of storing information regarding the operating state of the wireless unit M in advance of the call operation in memory.

On the other hand, when it is found that the operating state of the wireless unit M in advance of the call operation was the operation-disabled state, the controller 10 makes an inquiry with respect to the user to confirm whether it is permissible to set the transmit-disabled mode, i.e., whether it is permissible to change the operating state of the wireless unit M to the operation-disabled state (step S15).

Figure 5:
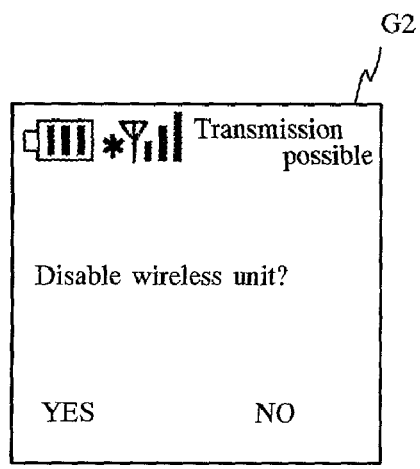
FIG. 5 is a diagram showing an example of a screen that is displayed on a display unit upon completion of communication in the case where operation of the wireless unit was disabled before the call was made.

The inquiry is made by, for example, using the display unit 6 to display the screen G2 shown in FIG. 5. The screen shown in FIG. 5, as an example, includes such items as "Transmission possible" indicating that the wireless transmission is currently enabled, "Disable wireless unit?" asking whether or not the operating state of the wireless unit M should be changed to the operation-disabled state, and "YES NO" as answers that can be selected by the user in reply to the inquiry.

Next, the controller 10 acquires a reply to the inquiry from the user (step S16). The acquisition of the reply can be achieved, for example, by the method of accepting an instruction which is input by the user's manipulation of the key operating unit 5 or, if the mobile telephone unit is equipped with a voice recognition device, by the method of accepting a voice instruction which is uttered by the user.

When the reply to the inquiry has been accepted from the user, the controller 10 decides the intent of the reply (step S17). When the controller 10 decides that the instruction means that the operating state of the wireless unit M should not be put in the operation-disabled state but should instead be maintained in the operation-enabled state, the controller 10 maintains the transmit-disabled mode in the released state, i.e., maintains the operating state of the wireless unit M so as to stay in the operation-enabled state, and stores, in the memory 9, information indicating that the state of the transmit-disabled mode in advance of the call operation is the released state, i.e., information indicating that the operating state of wireless unit M in advance of the call operation is the operation-enabled state (step 13), and the ordinary standby processing state is restored (step S14).

On the other hand, when the controller 10 decides that the instruction means that the operating state of the wireless unit M should be changed to return the wireless unit M to the operation-disabled state, the controller 10 stores, in the memory 9, information indicating that the state of the transmit-disabled mode in advance of the call operation is the set state, i.e., information indicating that the operating state of the wireless unit M in advance of the call operation is the operation-disabled state, changes the transmit-disabled mode from the released state to the set state, i.e., changes the operating state of the wireless unit M from the operation-enabled state to the operation-disabled state, and stores, in the memory 9, information indicating that the current operating state of the wireless unit M is the operation-disabled state (step 18), whereby the operating state of the wireless unit M is returned to the operation-disabled state (step S19).

More specifically, the transmit-disabled mode is set, and the wireless unit M is put in the operation-disabled state by cutting off the supply of power to the wireless unit M or by stopping execution of the program task for controlling the wireless unit M. When the operation of the wireless unit M is stopped in this manner, the wireless unit M is prevented from transmitting wireless signals from the antenna 1, so that no wireless signals are thereafter transmitted until the next wireless transmission is permitted.

As explained in the foregoing, the mobile telephone unit of this embodiment is equipped with a wireless unit M whose operating state can be switched between an operation-enabled state and an operation-disabled state. If the user conducts a call request operation when the wireless unit M is in the operation-disabled state, the user is asked to confirm beforehand that switching of the operating state of the wireless unit M from the operation-disabled state to the operation-enabled state is acceptable. The operating state of the wireless unit M is switched to the operation-enabled state, and a call operation is conducted only when the user replies that the operating state change is acceptable, i.e., only when the user elects to change the operating state of the wireless unit M to the operation-enabled state. When the user replies that the operating state change is unacceptable, i.e., when the user elects to maintain the operating state of the wireless unit M in the operation-disabled state, the operating state of the wireless unit M is not changed to the operation-enabled state but is instead maintained in the operation-disabled state.

The user of the mobile telephone unit of this embodiment can therefore change the operating state of the wireless unit M to the operation-enabled state and conduct a call operation merely by conducting a simple operation even when the wireless unit M is in the operation-disabled state. Further, if the user should conduct a call request operation by mistake when the wireless unit M is in the operation-disabled state, the user will be asked whether a change of the operating state of the wireless unit M to the operation-enabled state is acceptable before the change is made and the operation-disabled state will be maintained until the user inputs an instruction approving the call operation. The occurrence of call operations by mistake can therefore be prevented.

Moreover, in the mobile telephone unit of this embodiment, which is equipped with a wireless unit M whose operating state can be switched between an operation-enabled state and an operation-disabled state, when wireless communication which is initiated by a call operation that is conducted when the wireless unit M was in the operation-disabled state is terminated, the user is asked to confirm beforehand whether it is acceptable to switch the operating state of the wireless unit M from the operation-enabled state to the operation-disabled state. The operating state of the wireless unit M is switched to the operation-disabled state, the state in effect prior to the call operation, only when the user replies that the operating state change is acceptable, i.e., only when the user elects to change the operating state of the wireless unit M to the operation-disabled state. When the user replies that the operating state change is unacceptable, i.e., when the user elects to maintain the operating state of the wireless unit M in the operation-enabled state, the operating state of the wireless unit M is not changed to the operation-disabled state but is instead maintained in the operation-enabled state.

Therefore, with the mobile telephone unit of this embodiment, after conducting a call operation with the wireless unit M in the operation-disabled state, the user can return the wireless unit M to the operation-disabled state merely by conducting a simple operation and, by electing to maintain the operation-enabled state of the wireless unit M in response to the inquiry, can maintain the operation-enabled state of the wireless unit M.

Typical methods which are available for presenting inquiries to the user and for the user to input instructions in response to the inquiries include those of displaying the inquiries on the screen of the display unit 6 in the form of words or icons and of accepting instructions which are input by the user using the key operating unit 5. Alternatively, however, the presentation of inquires and the acceptance of instructions can instead be conducted by a method utilizing voice, vibration or the like.

The foregoing embodiment was explained with regard to the case where two inquiries are made when a call request operation was conducted with the transmit-disabled mode set: an inquiry requesting confirmation of whether the transmit-disabled mode should be released and a call operation be conducted; and an inquiry that is made upon termination of wireless communication which is enabled by such a call operation requesting confirmation of whether the transmit-disabled mode should be reset. However, a configuration that makes only one or the other of the two inquiries and a configuration that makes neither of the two inquiries are also possible.

For example, the transmit-disabled mode can be released and a call operation can be conducted in response to the acceptance of a call request operation conducted with the transmit-disabled mode set, without making an inquiry. In this case, the user can, by conducting a call request operation in the ordinary conventional manner, initiate a call operation corresponding to the call request operation. Then, upon completion of the wireless communication which is enabled by the call operation, if the transmit-disabled mode is reset without making an inquiry, the transmit-disabled mode can be reset without requiring the user to conduct any particular operation after termination of the wireless communication.

In this embodiment, the functional unit composed of the transmitter 3, the antenna duplexer 2, the antenna 1 and the controller 10, which controls the transmitter 3 to conduct wireless transmission by using the antenna duplexer 2 and the antenna 1, constitute the wireless transmitter unit of the present invention.

In this embodiment, the function of the key operating unit 5 that accepts call request operations from the user constitutes the accepting means of the present invention.

In this embodiment, the function of the controller 10 that responds to an acceptance of a call request operation when the transmit-disabled mode is set by releasing the transmit-disabled mode and causing the wireless transmitter unit to conduct wireless transmission based on the call request operation constitutes the releasing means of the present invention. The function of the controller 10 that operates before the transmit-disabled mode is released to ask (inquire) the user whether or not release of the transmit-disabled mode is permissible constitutes inquiry means of the present invention.

In this embodiment, the function of the key operating unit 5 that accepts an instruct operation permitting a release input by the user in response to the inquiry constitutes the release accepting means of the present invention. The function of the key operating unit 5 that accepts an instruct operation refusing a release input by the user constitutes the refuse accepting means of the invention.

In this embodiment, the releasing means releases the transmit-disabled mode and causes the wireless transmitter unit to conduct wireless transmission based on the accepted call request operation on the condition that a release-permitted instruct operation was accepted, and maintains the set state of the transmit-disabled mode when a release-refused instruct operation was accepted.

In this embodiment, the function of the controller 10 that resets the transmit-disabled mode after completion of wireless communication utilizing the wireless transmission which was enabled by the releasing means constitutes the reset control means of the present invention. The function of the controller 10 that operates before the transmit-disabled mode is reset to ask the user whether or not resetting of the transmit-disabled mode is permissible constitutes the reset permissibility inquiry means of the present invention.

In this embodiment, the function of the key operating unit 5 that accepts an instruct operation permitting reset input by the user in response to the inquiry constitutes the reset instruction accepting means of the present invention. The function of the key operating unit 5 that accepts an instruct operation refusing a reset input by the user constitutes the refuse instruction accepting means of the present invention.

In this embodiment, the reset control means resets the transmit-disabled mode on the condition that a reset-permitted instruct operation was accepted, and maintains the released state of the transmit-disabled mode when a reset-refused instruct operation was accepted.

The configuration of the mobile telecommunications device according to the present invention is not limited to that set out in the foregoing and any of various other configurations can be adopted instead.

In addition, the field of application of the present invention is not limited to that discussed in the foregoing, and application in various other fields is also possible. While application of the present invention to a mobile telephone system or personal handy phone system (PHS) was exemplified as a preferred embodiment in the foregoing, the present invention can also be applied to mobile wireless data telecommunication devices having a wireless data communication capability but which are not equipped with wireless telephony capability, and is thus applicable to various types of mobile telecommunications devices.

In addition, the various types of processing which are performed in the mobile telecommunications device according to the present invention may be constituted by being implemented in hardware resources that are equipped with a processor and memory and the like, for example, by being controlled by means of the processor executing a control program stored in ROM. Further, the various functional means for executing this processing may also be constituted as independent physical circuits.

In addition, the present invention may also be understood as the aforesaid control program per se or as a floppy disk, CD-ROM or other computer-readable recording media in which the control program is stored, so that the processing according to the present invention can be implemented by loading the control program from the recording medium into a computer and executing the program by a processor.

As explained in the foregoing, the present invention provides a mobile telecommunications device whose wireless transmitter unit can be set to a transmit-disabled mode in which all wireless transmission is disabled, which is configured to respond to an acceptance of a call request operation of the user when the transmit-disabled mode is set by releasing the transmit-disabled mode and causing the wireless transmitter unit to conduct wireless transmission based on the call request operation. The convenience of the user making a call when the transmit-disabled mode is set is therefore enhanced.

In the mobile telecommunications device according to the present invention, when the transmit-disabled mode is set, release of the transmit-disabled mode in response to a call request operation is preceded by an inquiry to the user as to whether release of the transmit-disabled mode is permissible. The user is therefore warned of the release of the transmit-disabled mode before the release is effected.

In the mobile telecommunications device according to the present invention, the transmit-disabled mode is released and the wireless transmitter unit conducts wireless transmission based the accepted call request operation on the condition that a release-permitted instruct operation was accepted from the user in response to the inquiry. It is therefore possible to prevent release of the transmit-disabled mode and wireless transmission in a case where the call request operation is the result of a misoperation.

In the mobile telecommunications device according to the present invention, when a release-refused instruct operation was accepted from the user in response to the inquiry, the transmit-disabled mode is maintained in the set state. It is therefore possible to prevent release of the transmit-disabled mode and wireless transmission in a case where the call request operation is the result of a misoperation.

In the mobile telecommunications device according to the present invention, the transmit-disabled mode is reset after completion of the wireless communication utilizing the wireless transmission which is enabled by the release of the transmit-disabled mode. The convenience of the user upon completion of the wireless communication is therefore improved.

In the mobile telecommunications device according to the present invention, the resetting of the transmit-disabled mode after completion of wireless communication utilizing wireless transmission enables the release of the transmit-disabled mode in the aforesaid manner is preceded by an inquiry to the user as to whether resetting of the transmit-disabled mode is permissible. The user is therefore warned of the resetting of the transmit-disabled mode before the resetting is effected.

In the mobile telecommunications device according to the present invention, the transmit-disabled mode is reset on the condition that a reset-permitted instruct operation was accepted from the user in response to the inquiry. It is therefore possible to reset the transmit-disabled mode only when the user desires (requests) resetting of the transmit-disabled mode.

In the mobile telecommunications device according to the present invention, the released state of the transmit-disabled mode is maintained when a reset-refused instruct operation was accepted.

Therefore, even after completion of wireless communication, the released state of the transmit-disabled mode is maintained if a transmit-disabled mode reset-refused instruct operation is accepted from the user in response to the inquiry. It is therefore possible to prevent resetting of the transmit-disabled mode when the user requests the transmit-disabled mode to remain released.

What is claimed is:

1. A mobile telecommunications device having a wireless transmitter unit which is operable to be set to a transmit-disabled mode in which all wireless transmission is disabled, said mobile telecommunications device comprising:
    accepting means for accepting call request operations from a user;
    releasing means for, when the transmit-disabled mode is set, responding to said accepting means accepting a call request operation by releasing the transmit-disabled mode of said wireless transmitter unit and causing said wireless transmitter unit to conduct wireless transmission based on the accepted call request operation;
    inquiry means for, when said accepting means accepts the call request operation when the transmit-disabled mode is set and before said releasing means releases the transmit-disabled mode in response to said accepting means accepting the call request operation, inquiring the user whether or not releasing the transmit-disabled mode is permissible; and
    release accepting means for accepting a release-permitted instruction operation permitting a release input by the user in response to an inquiry from said inquiry means;
    wherein said releasing means releases the transmit-disabled mode and causes said wireless transmitter unit to conduct wireless transmission based on the accepted call request operation when a release-permitted instruction operation was accepted by said release accepting means; and
    wherein said mobile telecommunications device further comprises:
        reset control means for resetting the transmit-disabled mode after completion of wireless communication utilizing the wireless transmission enabled by said releasing means; and
        reset permissibility inquiry means for, upon completion of the wireless communication utilizing the wireless transmission enabled by said releasing means and before said reset control means resets the transmit-disabled mode, inquiring the user whether or not resetting of the transmit-disabled mode is permissible.

2. A mobile telecommunications device according to claim 1, further comprising reset instruction accepting means for accepting a reset-permitted instruction operation permitting a reset input by the user in response to an inquiry from said reset permissibility inquiry means;
    wherein said reset control means resets the transmit-disabled mode when a reset-permitted instruction operation was accepted by said reset instruction accepting means.

3. A mobile telecommunications device according to claim 1, further comprising refuse instruction accepting means for accepting a reset-refused instruction operation refusing a reset input by the user in response to an inquiry from said reset permissibility inquiry means,
    wherein said reset control means maintains the released state of the transmit-disabled mode when a reset-refused instruction operation was accepted by said refuse instruction accepting means.

4. A mobile telecommunications device having a wireless transmitter unit which is operable to be set to a transmit-disabled mode in which all wireless transmission is disabled said mobile telecommunications device comprising:
    accepting means for accepting call request operations from a user;
    releasing means for, when the transmit-disabled mode is set, responding to said accepting means accepting a call request operation by releasing the transmit-disabled mode of said wireless transmitter unit and causing said wireless transmitter unit to conduct wireless transmission based on the accepted call request operation;
    inquiry means for, when said accepting means accepts the call request operation when the transmit-disabled mode is set and before said releasing means releases the transmit-disabled mode in response to said accepting means accepting the call request operation, inquiring the user whether or not releasing the transmit-disabled mode is permissible; and
    refuse accepting means for accepting a release-refused instruction operation refusing a release input by the user in response to an inquiry from said inquiry means;
    wherein said releasing means maintains the set state of the transmit-disabled mode when a release-refused instruction operation was accepted by said refuse accepting means.

5. A mobile telecommunications device according to claim 4, further comprising reset control means for resetting the transmit-disabled mode after completion of wireless communication utilizing the wireless transmission enabled by said releasing means.

6. A mobile telecommunications device according to claim 5, further comprising reset permissibility inquiry means for, upon completion of the wireless communication utilizing the wireless transmission enabled by said releasing means and before said reset control means resets the transmit-disabled mode, inquiring the user whether or not resetting of the transmit-disabled mode is permissible.

7. A mobile telecommunications device according to claim 6, further comprising reset instruction accepting means for accepting a reset-permitted instruction operation permitting a reset input by the user in response to an inquiry from said reset permissibility inquiry means,
wherein said reset control means resets the transmit-disabled mode when a reset-permitted instruction operation was accepted by said reset instruction accepting means.

8. A mobile telecommunications device according to claim 6, further comprising refuse instruction accepting means for accepting a reset-refused instruction operation refusing a reset input by the user in response to an inquiry from said reset permissibility inquiry means,
wherein said reset control means maintains the released state of the transmit-disabled mode when a reset-refused instruction operation was accepted by said refuse instruction accepting means.

9. A mobile telecommunications device having a wireless transmitter unit which is operable to be set to a transmit-disabled mode in which all wireless transmission is disabled, said mobile telecommunications device comprising:
accepting means for accepting call request operations from a user;
releasing means for, when the transmit-disabled mode is set, responding to said accepting means accepting a call request operation by releasing the transmit-disabled mode of said wireless transmitter unit and causing said wireless transmitter unit to conduct wireless transmission based on the accepted call request operation;
inquiry means for, when said accepting means accepts the call request operation when the transmit-disabled mode is set and before said releasing means releases the transmit-disabled mode in response to said accepting means accepting the call request operation, inquiring the user whether or not releasing the transmit-disabled mode is permissible;
reset control means for resetting the transmit-disabled mode after completion of wireless communication utilizing the wireless transmission enabled by said releasing means; and
reset permissibility inquiry means for, upon completion of the wireless communication utilizing the wireless transmission enabled by said releasing means and before said reset control means resets the transmit-disabled mode, inquiring the user whether or not resetting of the transmit-disabled mode is permissible.

10. A mobile telecommunications device according to claim 9, further comprising reset instruction accepting means for accepting a reset-permitted instruction operation permitting a reset input by the user in response to an inquiry from said reset permissibility inquiry means, wherein said reset control means resets the transmit-disabled mode when a reset-permitted instruction operation was accepted by said reset instruction accepting means.

11. A mobile telecommunications device according to claim 9, further comprising refuse instruction accepting means for accepting a reset-refused instruction operation refusing a reset input by the user in response to an inquiry from said reset permissibility inquiry means,
wherein said reset control means maintains the released state of the transmit-disabled mode when a reset-refused instruction operation was accepted by said refuse instruction accepting means.

12. A mobile telecommunications device having a wireless transmitter unit which is operable to be set to a transmit-disabled mode in which all wireless transmission is disabled said mobile telecommunications device comprising:
accepting means for accepting call request operations from a user;
releasing means for when the transmit-disabled mode is set, responding to said accepting means accepting a call request operation by releasing the transmit-disabled mode of said wireless transmitter unit and causing said wireless transmitter unit to conduct wireless transmission based on the accepted call request operation; and
inquiry means for when said accepting means accepts the call request operation when the transmit-disabled mode is set and before said releasing means releases the transmit-disabled mode in response to said accepting means accepting the call request operation, inquiring the user whether or not releasing the transmit-disabled mode is permissible;
wherein, when the user informs said inquiry means that releasing the transmit-disabled mode is permissible when said accepting means accepts the call request operation while said wireless transmission unit is set to the transmit-disabled mode, said releasing means releases the transmit-disabled mode of said wireless transmitter unit.

13. A mobile telecommunications device having a wireless transmitter unit which is operable to be set to a transmit-disabled mode in which all wireless transmission is disabled, said mobile telecommunications device comprising:
accepting means for accepting call request operations from a user, releasing means for, when the transmit-disabled mode is set, responding to said accepting means accepting a call request operation by releasing the transmit-disabled mode of said wireless transmitter unit and causing said wireless transmitter unit to conduct wireless transmission based on the accepted call request operation;
reset control means for automatically resetting the transmit-disabled mode of said wireless transmitter unit after completion of wireless communication utilizing the wireless transmission enabled by said releasing means; and
reset permissibility inquiry means that operates upon completion of wireless communication utilizing wireless transmission enabled by the releasing means and before the reset control means resets the transmit-disabled mode to ask the user whether or not reset of the transmit-disabled mode is permissible.

14. A mobile telecommunications device according to claim 13, further comprising reset instruction accepting means for accepting an instruction operation permitting a reset input by the user in response to an inquiry from said reset permissibility inquiry means,
wherein said reset control means resets the transmit-disabled mode when a reset-permitted instruction operation was accepted by said reset instruction accepting means.

15. A mobile telecommunications device according to claim 13, further comprising refuse instruction accepting means for accepting a reset-refused instruction operation refusing a reset input by the user in response to an inquiry from said reset permissibility inquiry means,
wherein said reset control means maintains the released state of the transmit-disabled mode when a reset-refused instruction operation was accepted by said refuse instruction accepting means.

* * * * *